United States Patent [19]

Manfré et al.

[11] Patent Number: 4,806,204

[45] Date of Patent: Feb. 21, 1989

[54] ELECTRICALLY CONDUCTIVE FILTER PAPER AND FILTER USING SUCH A PAPER

[75] Inventors: Giovanni Manfré; Giuseppe Mannone, both of Turin, Italy

[73] Assignee: Fiat Auto S.p.A., Turin, Italy

[21] Appl. No.: 610,164

[22] Filed: May 14, 1984

[30] Foreign Application Priority Data

May 23, 1983 [IT] Italy ................. 67567 A/83

[51] Int. Cl.⁴ ............................................. D21H 5/18
[52] U.S. Cl. ...................... 162/106; 162/124; 162/138; 162/145; 162/146
[58] Field of Search .............. 162/105, 106, 138, 145, 162/146, 124; 210/184, 185, 186; 428/607, 608, 374, 388

[56] References Cited

U.S. PATENT DOCUMENTS

| | | | |
|---|---|---|---|
| 4,045,949 | 9/1977 | Paton et al. | 428/374 |
| 4,129,677 | 12/1978 | Boe | 428/374 |
| 4,312,913 | 1/1982 | Rheaume | 428/388 |
| 4,404,949 | 9/1983 | Bell | 210/184 |

FOREIGN PATENT DOCUMENTS

| | | | |
|---|---|---|---|
| 243735 | 3/1963 | Australia | 162/138 |
| 2721607 | 11/1978 | Fed. Rep. of Germany | 210/185 |
| 628205 | 9/1978 | U.S.S.R. | 162/138 |
| 1568503 | 5/1980 | United Kingdom . | |

*Primary Examiner*—Peter Chin
*Attorney, Agent, or Firm*—Sughrue, Mion, Zinn, Macpeak & Seas

[57] ABSTRACT

The filter paper according to the invention is characterised in that it contains electrically conductive fibers which render it electrically conductive and able to allow the heating of the fluid to be filtered by the Joule effect. According to a particularly advantageous application, this paper may be used in filters for fuel supply circuits in diesel engines, in order to prevent the blockage of such filters at low temperatures as a result of the freezing of paraffin contained in the fuel.

6 Claims, No Drawings

ELECTRICALLY CONDUCTIVE FILTER PAPER AND FILTER USING SUCH A PAPER

The present invention relates to an electrically conductive porous filter paper able to allow the heating of the fluid to be filtered by the Joule effect.

Among the various applications for such filter papers is that of fuel filters for diesel engine fuel suppy circuits.

Filters of this type are prone to clogging at low temperatures as a result of the freezing of paraffin contained in the fuel. DE-A-27 21 607 discloses a fuel filter including an electrically conductive filter paper, able to allow the heating of the fuel, so as to avoid the above mentioned problem.

However, in this known solution the filter paper is rendered electrically conductive by applying a coating of electrically conductive material on the paper. This results in inefficient operation of the device, since a relatively great amount of electric energy is required in order to obtain a given increase in the fuel temperature. Moreover, the porosity characteristics of the filter paper are negatively affected by the coating of conductive material.

The object of the present invention is to provide an electrically conductive filter paper which allows efficient heating at low voltage of the filtered fluid to be obtained with small consumption of electric energy, the manufacture of such paper being relatively simple and economic. In order to achieve this object, the invention provides an electrically conductive porous filter paper, able to allow the heating of the fluid to be filtered by the Joule effect, characterised in that it contains electrically conductive fibres which render it electrically conductive.

Tests and studies conducted by the Applicant have shown that the use of a porous filter paper of this type allows efficient heating of the filtered fluid and is relatively simple and economic to manufacture, as it will be shown hereinafter.

Naturally, the filter paper according to the invention is useable not only in fuel filters for diesel engines but in general in any application in which it is necessary to heat a fluid passing through the paper.

The nature, the size and the quantity and arrangement of the electrically conductive fibres of the paper according to the invention are chosen so as to satisfy various requirements: primarily the degree of electrical resistivity necessary to achieve a desired temperature rise. In the second place there is the need to obtain the necessary porosity of the paper (in the application mentioned above the size of the pores of the paper must be between two and five microns with 70% of the pores being about 2.5 microns). It is also necessary for the paper to have good mechanical characteristics such as to allow the subsequent processing of the paper and its use (in the case of the application to fuel filters the paper must be able to withstand the fuel pressure).

The electrically conductive fibres may be metal fibres or non-metallic electrically conductive fibres (for example carbon or graphite) or non-metallic fibres coated with electrically conductive material or non-metallic fibres alongside and parallel to electrically conductive fibres. For example, glass fibres, refractory fibres or synthetic fibres of various types may be used alongside aluminium or silver fibres.

It is also possible to use electrically conductive organic fibres, or organic fibres coated with a conductive material, or carbon fibres coated with metal, such as nickel.

The electrically conductive fibres used in the paper according to the invention should have a length/diameter ratio greater than 100. The minimum quantity of the fibres which should be used is of the order of 1% by weight of the cellulose of the paper. The quantity of fibres used should not exceed a certain limit (depending on the length and diameter of the fibres) in order to avoid the risk of a substantial reduction in the porosity and mechanical characteristics of the paper. The maximum percentage of fibres is about 50% by weight, which results in a limited reduction of the filtering properties. If no such reduction may be accepted the maximum percentage is 20%.

The electrically conductive fibres may be disposed randomly or in preferential directions of electrical conductivity or even in the form of a fabric. Moreover, the electrically conductive fibres may be randomly distributed among the other fibres of the paper; alternatively, it is possible to form a multi-layer structure in which at least one layer is constituted by a mat of electrically conductive fibres intercalated with layers formed by other fibres constituting the paper.

During the manufacture of the paper, the electrically conductive fibres are added during or at the end of the homogenisation of the mixture before it passes to the conventional calendering process. It is necessary to add a binder to the bath (or during manufacture of the fibres) which allows binding of the fibres and the cellulose. The filtering paper may be also a sinthetic paper, made of organic or non organic fibres. The binder is preferably constituted by an anionic resin (for example polyacrylic) since the cellulose is cationic. When it is desired to form a multilayer structure in which the electrically conductive fibre mat is interposed between two layers of paper, the arrangement of the electrically conductive fibres is achieved between the calendering of the first layer of paper and the calendering of the second layer of paper. When it is desired to have the layer of conductive fibres on the outside, the disposition of the electrically conductive fibres is achieved before the first calendering operation.

One preferred solution is that which allows the use of glass fibres coextruded with aluminium fibres. Each glass fibre is united with an aluminium fibre adjacent thereto. This solution has the advantage that even when several glass fibres break, for example as a result of handling of the paper, the aluminium fibres do not lose their continuity, ensuring constancy of the characteristics of the paper with time. Moreover, the glass fibres form a stable link with the aluminium fibres, preventing fusion of the latter. The thermal capacity of the glass fibres is in fact about twice that of the aluminium fibres, at least up to the melting point of the aluminium. The glass thus acts to adsorb heat ensuring a high current-carrying capacity. The quantity of glass fibre and aluminium fibre is preferably between 25% and 40% by weight of the cellulose fibres.

According to another preferred solution, carbon fibres are used. In this case, quantity of the fibres is preferably between 2% and 15% by weight of the cellulose fibres. Diameter of the carbon fibres is preferably 6–7 microns and length is preferably 6–8 mm. Density of the fibres should be substantially equal to that of the cellulose fibres, that is 1.2 g/cm$^3$, whereas density of the conductive fibres should be no more than 2.5 Kg/cm$^3$. The surface of the carbon fibres is preferably provided with an organic coating (preferably polyvinyl or polyacetyl) in a quantity of no more than 1% relative to the quantity of conductive fibres.

The present invention also provides a filter, particularly the fuel supply of a diesel engine, characterised in that it comprises a porous filter paper of the type specified above.

The constructional details of the filter according to the invention are not illustrated here since they are known per se.

Two opposite edges of the paper are provided with electrodes, for example by depositing a layer of conductive paint, or by glueing a film of copper or aluminium, adjacent to such edges, or inserting a metal wire in a series of holes of the paper, in a sewing fashion.

In this latter case, at least four holes must be formed in the paper for a length of 4 cm. The metal wire may be a wire of copper coated with tin. In another embodiment, the electrodes are provided by glueing a strip of copper onto each edge of the paper.

In a practical embodiment of the filter paper according to the invention, intended for use in a fuel filter for diesel engines, in order to form the electrically conductive fibres, glass fibres were used, coextruded with aluminium fibres with a diameter of 35 microns and a length of 25 mm.

The aluminium fibres were 40% by weight of the glass fibres. The total filtering surface was 4,000 cm$^2$. The electrically conductive fibres were connected to a 12 volt battery and conducted 0.43 A per 36 cm$^2$ of filtering surface in order to achieve a temperature rise of about 30° C. The power consumption was 500W. The filtering capacity of the filter was 36 liters/hour.

In another practical embodiment of the filter paper according to the invention, also intended for use in a fuel filter for diesel engines, a sheet of paper having a length of 4 m, a width of 9 cm and a thickness of 0.3 cm was manufactured, using carbon fibres as electrically conductive fibres. Quantity of the carbon fibres was 5% by weight of the cellulose fibres. The weight of the paper was 93 g/m$^2$. A temperature rise of 15° C. was obtained after 1 minute with a power consumption of 140W and a fuel flow rate of 10 liters/hour.

Naturally, with the principle of the invention remaining the same, constructional details and embodiments may be varied widely with respect to that described and illustrated purely by way of example, without thereby departing from the scope of the present invention.

We claim:

1. Electrically conductive porous filter paper for allowing the heating of the fluid to be filtered by the Joule effect, wherein said paper contains cellulose fibers and electrically conductive carbon fibers which render the paper electrically conductive, said carbon fibers having a diameter of 6–7 microns and a length of 6–8 mm.

2. Filter paper according to claim 1, wherein the said fibres are constituted by graphite fibres.

3. Filter paper according to claim 1, wherein the electrically conductive fibres are distributed in a random manner among the fibres of the paper.

4. Filter paper according to claim 1, wherein the quantity of electrically conductive fibres is between 1% and 50% by weight of the cellulose of the paper.

5. Filter paper according to claim 1, wherein the quantity of carbon fibres is between 2% and 15% by weight of the cellulose fibres.

6. Filter paper according to claim 1, wherein two opposite edges of the paper are provided with electrodes, each of such electrodes being formed by a wire of a metal which is not corrodable by the fluid, such wire being inserted in a series of holes of the paper, according to a sewing fashion.

* * * * *